April 3, 1956 F. E. WELPOTT ET AL 2,740,855
TIRE PRESSURE ALARM
Filed Aug. 14, 1953 3 Sheets-Sheet 1

Forrest E. Welpott
Wesley H. Patterson
INVENTORS.

Forrest E. Welpott
Wesley H. Patterson
INVENTORS

April 3, 1956
F. E. WELPOTT ET AL
2,740,855
TIRE PRESSURE ALARM
Filed Aug. 14, 1953
3 Sheets-Sheet 3
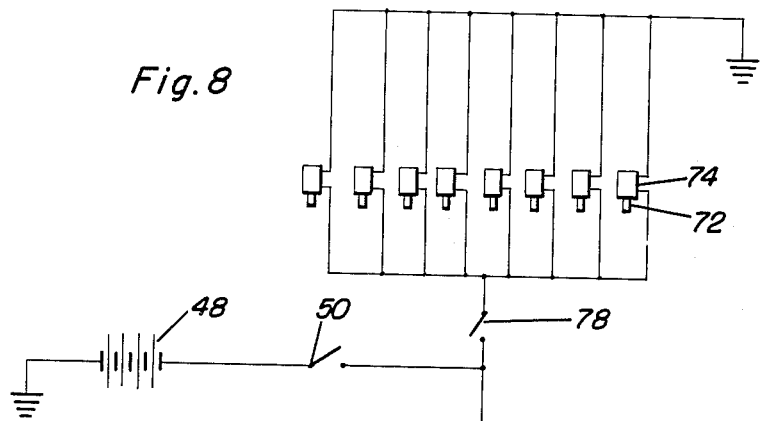
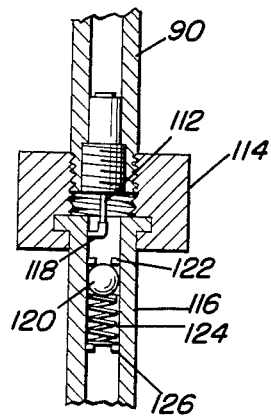
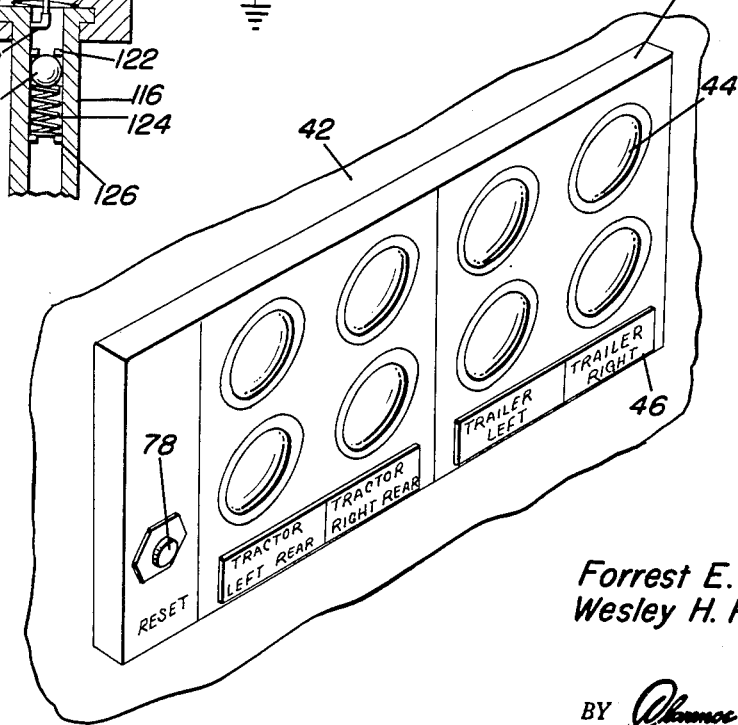
Forrest E. Welpott
Wesley H. Patterson
INVENTORS
BY *Clarence A. O'Brien*
*and Harvey B. Jackson*
Attorneys

United States Patent Office 2,740,855
Patented Apr. 3, 1956

2,740,855

TIRE PRESSURE ALARM

Forrest E. Welpott and Wesley H. Patterson, Bloomington, Ind.

Application August 14, 1953, Serial No. 374,298

4 Claims. (Cl. 200—61.25)

This invention relates to a tire pressure alarm and particularly to an alarm system to be placed in a motor vehicle of the type having a body supported on wheels with pneumatic tires so that the operator may tell the condition of the pressure in the various tires.

It frequently happens in the operation of vehicles that the tires become punctured or deflated for various reasons. Heretofore it has been extremely impractical for the operator to determine the actual pressure condition in the various tires. Consequently, serious injury, not only to the tires and tubes but to the vehicles frequently results because of the operation on insufficiently inflated tires.

The present invention relates specifically to an alarm system providing an indication to the operator of a vehicle of the pressure condition in each of his tires; also, it relates to a specific switch and control therefor for operating such a device in response to the pressure without a mechanical or electrical connection between the wheels and the signaling system.

The construction according to the invention has a control switch provided for each of the tires on the vehicle and in particular in the case of a dual wheel vehicle separate indicator switches are provided for each of the tires and a separate signal on the annunciator signal panel. The switches themselves being mounted on an immovable portion of the vehicle and out of both mechanical and electrical contact with the rotating wheel and an actuating device mounted on the rotating wheel and communicated to the pressure in the tires and has a projecting striker which will extend across and mechanically actuate a toggle arm on the switch when the tire to which it is connected has become sufficiently deflated.

It is accordingly an object of the invention to provide an improved air pressure indicating system.

It is a further object of the invention to provide a tire pressure indicating system having an actuator mounted on the wheel and a switch mounted on the vehicle.

It is a further object of the invention to provide an improved contact switch for a signal pressure indicator.

It is a further object of the invention to provide an improved switch actuator for a tire pressure indicator.

Further objects and many of the attendant advantages of the present invention will be apparent from the following detailed description taken in conjunction with the accompanying drawings, in which:

Figure 8 is a schematic wiring diagram of the alarm system according to the invention;

Figure 9 is a perspective view of the annunciator board showing a reset switch; and Figure 10 is a sectional view of the safety valve according to the invention.

Figure 1:
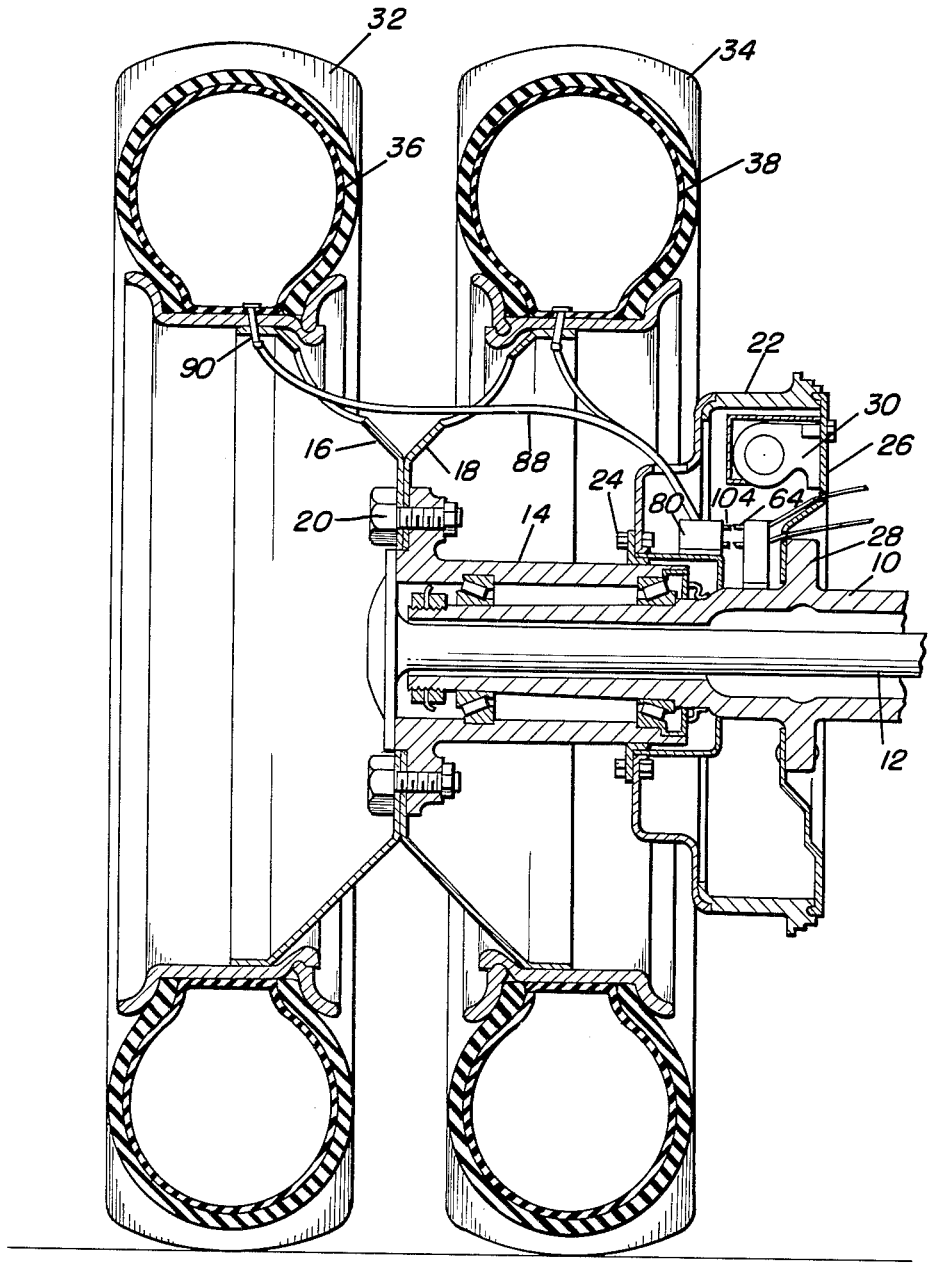
Figure 1 is a sectional elevation through a dual wheel mounting of a motor vehicle showing a pressure switch and switch actuator in place.
Figure 2:
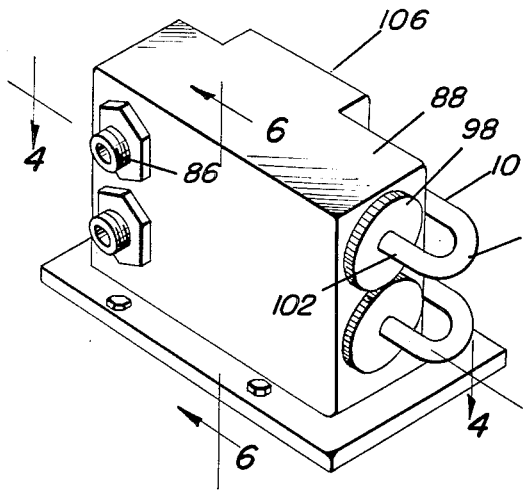
Figure 2 is an enlarged persepective view of the pressure responsive striker.
Figure 3:
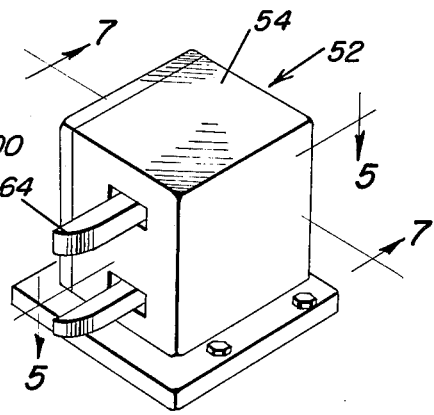
Figure 3 is an enlarged perspective view of the switch.
Figure 4:
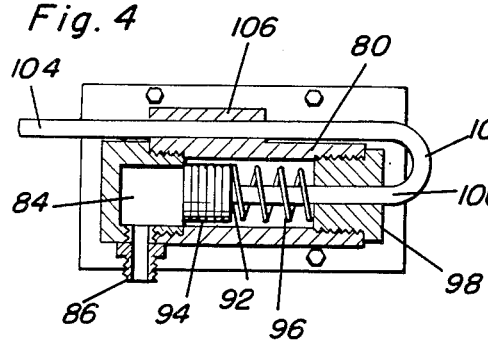
Figure 4 is a longitudinal section of the striker taken substantially on the plane indicated by the section line 4—4 of Figure 2.
Figure 5:
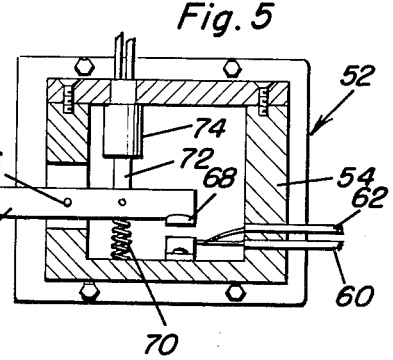
Figure 5 is a longitudinal section of the switch assembly taken substantially on the plane indicated by the section line 5—5 of Figure 3.
Figure 6:
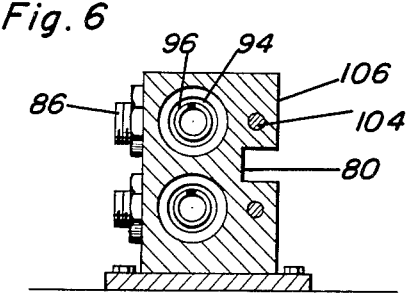
Figure 6 is a cross section through the striker taken substantially on the plane indicated by the section line 6—6 of Figure 2.
Figure 7:
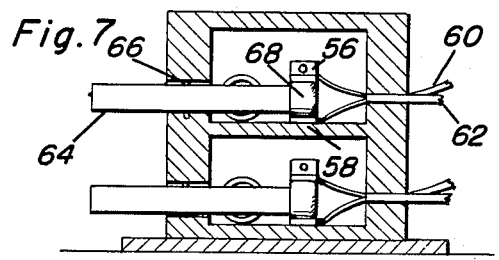
Figure 7 is a cross section of the switch taken substantially on the plane indicated by the section line 7—7 in Figure 3.

In the exemplary embodiment according to the invention a motor vehicle is indicated by means of the axle housing 10 in which is extended an axle 12 which is connected to a wheel hub 14 on which is mounted a pair of wheels 16 and 18 by means of suitable hub bolts 20. A brake drum 22 is fixed on the hub 14 by means of suitable bolts 24 and turns with the wheels 16 and 18.

The brake housing 26 is mounted on a suitable collar 28 on the axle housing 10 and has the usual brake equipment 30 mounted thereon for engagement with the brake drum 22 to apply a braking action to the wheels 16 and 18. The wheels 16 and 18 are provided with suitable pneumatic tires 32 and 34 having tubes 36 and 38 therein which carry a charge of air under compression to maintain the tires properly distended during operation.

The above noted construction being standard construction in automotive equipment and no portion of the present invention.

The system according to the present invention comprises an annunciator board 40 mounted on the instrument panel 42 of the vehicle and having a plurality of signal lamps 44 mounted therein, preferably suitable indicia 46 is applied on the annunciator board 40 so that the operator may tell at a glance which tire is in dangerous condition.

Lamps 44 will be supplied with energy from a suitable battery 48 which is preferably the usual operating battery of the vehicle. The entire signaling system will be controlled by means of a manual switch 50 which may be coupled into the ignition system of the vehicle. The individual signal lamps 54 being controlled by a switch indicated generally at 52 for each of the wheels of the vehicle.

The switch indicated generally at 52 is mounted in a housing 54 preferably constituted of insulating material and mounted within the brake shoe housing 26 in proximity to the end of the hub 14.

The switch elements generally comprise a pair of fixed contact elements 56 and 58 mounted on the housing 54 on spaced apart relation so that the conductors 60 and 62 may be readily connected thereto. A toggle arm 64 is pivotally mounted in the housing 54 by means of a suitable pivot pin 66. Preferably the toggle arm 64 is constructed of insulating material and carries a movable contact element 68 which is adapted to extend between and bridge a contact element 56 or 58 when the toggle arm is engaged by a striker member presently to be described. A stabilizer spring 70 is attached to the arm 64 to maintain it in normal open relation. Also an armature 72 is hingedly or pivotally connected to the arm 64 and extends partially within a solenoid 74 or other magnetic coil so that when the coil 74 is energized as by means of the reset switch 78, the toggle arms 64 will be raised out of contact with a fixed contact 56 or 58 to open the circuit including the conductors 62 and 60.

To provide an actuating device responsive to the tire pressure for operating the toggle arms 64, an actuator block 80 is mounted on the hub 14 or the brake drum or some other portion which rotates with the wheel and is aligned so that the block 80 will be in alignment with the housing 54 once during each revolution of the wheels. Block 80 is provided with an internal cylinder 84, one end of which is provided with a coupler 86 to be connected to a conduit 88 which communicates with the interior of the tire tube such as 36 by means of a connector link.

A piston 92 is sealed to the cylinder 84 by means of an extensible bellows 94 and is biased to a predetermined relation in the cylinder 84 by means of biasing spring 96. The spring 96 is attached in the end of the cylinder 84 and a tension nut 98 may be provided to adjust the pressure on the spring 96 so that the piston 92 will respond to a predetermined pressure.

A piston rod 100 is connected to the piston 92 and extends outwardly through the adjusting nut 98 and is provided with a U-shaped bight 102 which connects to a striker leg 104 which is slidably mounted in a guide 106 on the side of the block 80. When only one tire is mounted on a particular wheel the block 80 will contain only one cylinder 84 and obviously as many cylinders 84 and strikers 104 will be provided as there are tires mounted on a wheel. Also, it will be apparent that there will be as many toggle arms 64 as there are strikers 104 so that the various tires will be indicated on the annunciator 40.

In order to properly communicate the cylinder 84 with the interior pressure in the tire tube 36 a coupler 90 is provided with a safety valve 112 having a coupling block 114 to which is attached a connector 116 to which the flexible conduit 88 is connected. The connector 116 is provided with a depressing pin 118 for engagement with the end of the valve 112 to open the valve to allow pressure into the connector. The safety valve 120 is arranged in the form of a ball seated on a valve seat 122 and maintained in position by means of a spring 124 on a perforated seat 126. The valve spring 124 is adjusted to a specification so that the breakage of the conduit 88 will not release the air from the tire tube 36 but will merely allow the pressure to fall to a minimum after which the spring 124 will close the valve and prevent further leakage. For example, in a normal truck valve having pressure of 70 and 75 pounds, the safety valve 120 will have a spring 124 which will close at 50 pounds, so that at 50 pounds of pressure the ball valve will close and prevent further leakage from the tire.

In the operation of a system according to the invention switch actuators will be mounted on the wheel and connected by means of conduits 88 into the various tire tubes through the safety connections 90. Switches will be mounted on the fixed portions of the vehicle such as the brake housing and arranged so that the actuators 104 and the toggle arms 64 will be in alignment once during each revolution of the wheel. The switches 52 will be connected to the various signal lights on the annunciator 40 so that when the pressure within any cylinder falls and the striker 104 is projected against the toggle arm 64 a corresponding signal light will be lighted.

After all of the adjustments have been made switch 50 will be closed to apply power to all of the switches 52 and the reset switch 78 will be operated to energize all of the solenoids 74 and open all of the switches 52 into the normal operating position. Springs 70 will maintain the arms 64 in normal open condtion until a low pressure in one of the tires causes the corresponding striker 104 to be projected at which time the striker will strike the arms 64 and cause the movable contact 68 to be received between fixed contacts 56 and 58 to energize the proper signal circuit. After the tire has been properly reinflated the switch 78 will again be closed to reset any signal lamps which have been energized.

Each striker device will be provided with a spring 96 having a pressure such that as long as there is a safe pressure in the tire the plunger 100 will be maintained in the standard relation so that the striker 104 will be withdrawn from striking range with respect to the arm 64.

Upon the failure of pressure below a predetermined safe amount spring 96 will push the piston 92 inwardly and project the striker 104 so that its path of movement will lie in a position to engage the end of the arm 64 so that at each revolution of the wheel the striker 104 will engage the end of the arm 64 to maintain it in a seated relation so that the signal will continue to be illuminated.

It will thus be apparent that the present invention provides a convenient and practical system utilizing a switch mounted on a vehicle and a striker mounted on a wheel so that the switches do not have to be communicated to the circuits through any slip rings or other devices but remain constantly on the vehicle and are completely free from the wheel and its operating devices until such time as there is a dangerous condition in the tire when a mechanical contact will be established between the switch and the actuator.

For purpose of exemplification a particular embodiment of the invention has been shown and described according to the best present understanding thereof. However, it will be apparent to those skilled in the art that various changes and modifications may be made in the specific parts and the arrangement thereof without departing from the true spirit and scope of the invention.

What is claimed as new is as follows:

1. For use on a vehicle mounted on wheels having pneumatic tires and a brake drum and a brake housing fixed on the vehicle, a tire pressure signaling system comprising a switch mounted on the brake housing within the brake drum, a signal circuit controlled by said switch, a switch actuator mounted on the wheels within the brake drum, said switch actuator being operable in response to the pressure in the tire, said switch including a fixed contact, a toggle arm, a movable contact mounted on said lever for movement into and out of conducting relation with said fixed contact, said switch actuator including a striker movable into and out of engaging position with respect to said toggle arm, an armature connected to said toggle, a magnetic coil associated with said armature and circuit means including a reset switch for energizing said coil to move said movable contact out of conducting relation with said fixed contact.

2. A pressure alarm system for pneumatic tires comprising a pressure responsive striker including a casing adapted to be fixed on a portion of a wheel, a striker element projective from said casing in response to changes in tire pressure, means responsive to the tire pressure controlling the position of said striker element, a switch adapted to be mounted on a non-rotating member adjacent to said wheel, said switch including a switch operating arm extending into the path of rotation of said striker and engageable with a contact for transmitting a signal when the tire pressure falls below a predetermined pressure, a magnetic reset device operatively connected to said arm for disengaging said switch by moving said operating arm out of engagement with said contact.

3. In a pressure alarm system for pneumatic tires having a striker element projecting from a portion of a wheel with the position of the striker being controlled by the pressure in a tire, a switch comprising a housing, a pair of spaced apart contact elements, a toggle arm pivotally mounted in said housing, a portion of said toggle arm extending from said housing and adapted to be engaged by the striker, a bridging contact carried by said toggle arm, said bridging contact being received between said contact elements when said arm is engaged by a striker, a magnetic reset device operatively connected to said toggle arm and operative to disengage said bridging contact from said contact elements.

4. In a pressure alarm system for pneumatic tires having a striker element projecting from a portion of a wheel with the position of the striker being controlled by the pressure in a tire, a switch comprising a housing, a pair of spaced apart contact elements, a toggle arm pivotally mounted in said housing, a portion of said toggle arm extending from said housing and adapted to be engaged by the striker, a bridging contact carried by said toggle arm, said bridging contact being received between said contact elements when said arm is engaged by a striker, a solenoid mounted in said casing, a plunger in said solenoid and pivotally connected to said arm, said solenoid being operative to disengage said bridging contact from said contact elements.

References Cited in the file of this patent

UNITED STATES PATENTS

| | | |
|---|---|---|
| 1,393,344 | Conrad | Oct. 11, 1921 |
| 1,703,734 | Henry | Feb. 26, 1929 |
| 1,829,699 | Zigelman et al. | Oct. 27, 1931 |
| 2,256,688 | Pierce | Sept. 23, 1941 |
| 2,316,461 | Schubert | Apr. 13, 1943 |
| 2,445,959 | Luper | July 27, 1948 |
| 2,475,533 | Varner | July 5, 1949 |
| 2,482,984 | Lana et al. | Sept. 27, 1949 |
| 2,523,594 | Sagaser et al. | Sept. 26, 1950 |